United States Patent
Qiu et al.

(10) Patent No.: US 9,580,526 B2
(45) Date of Patent: *Feb. 28, 2017

(54) PARTIALLY FLUORINATED POLYSULFINIC ACIDS AND THEIR SALTS

(75) Inventors: Zai-Ming Qiu, Woodbury, MN (US); Gregg D. Dahlke, St. Paul, MN (US); Tatsuo Fukushi, Woodbury, MN (US); Werner M. Grootaert, Oakdale, MN (US); Miguel A. Guerra, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/885,185

(22) PCT Filed: Dec. 9, 2011

(86) PCT No.: PCT/US2011/064136
§ 371 (c)(1),
(2), (4) Date: May 14, 2013

(87) PCT Pub. No.: WO2012/082546
PCT Pub. Date: Jun. 21, 2012

(65) Prior Publication Data
US 2013/0281648 A1    Oct. 24, 2013

Related U.S. Application Data

(60) Provisional application No. 61/424,107, filed on Dec. 17, 2010.

(51) Int. Cl.
| C08F 14/16 | (2006.01) |
| C08F 8/34 | (2006.01) |
| C08F 114/16 | (2006.01) |
| C08F 8/44 | (2006.01) |
| C08F 28/02 | (2006.01) |

(52) U.S. Cl.
CPC .............. *C08F 114/16* (2013.01); *C08F 8/34* (2013.01); *C08F 8/44* (2013.01); *C08F 14/16* (2013.01); *C08F 28/02* (2013.01)

(58) Field of Classification Search
CPC ........ C08F 14/16; C08F 28/02; C08F 114/16; C08F 8/44; C08F 8/34
USPC .......................................... 526/243; 562/125
See application file for complete search history.

(56) References Cited

U.S. PATENT DOCUMENTS

| 2,950,317 | A |   | 8/1960 | Brown |
| 4,267,364 | A | * | 5/1981 | Grot et al. .................. 560/183 |
| 4,587,274 | A | * | 5/1986 | Nakahara et al. ............ 522/126 |
| 5,285,002 | A |   | 2/1994 | Grootaert |
| 5,639,837 | A |   | 6/1997 | Farnham |
| 6,274,632 | B1 | * | 8/2001 | Salmon ........................ 514/708 |
| 7,202,327 | B2 | * | 4/2007 | Haring et al. ............... 528/391 |
| 9,187,630 | B2 | * | 11/2015 | Lavallee ................ C08L 27/12 |
| 2003/0013816 | A1 |   | 1/2003 | Bekiarian |
| 2004/0121210 | A1 |   | 6/2004 | Hamrock |
| 2004/0214957 | A1 | * | 10/2004 | Moya ........................ 525/326.2 |
| 2004/0247548 | A1 |   | 12/2004 | Haring |
| 2005/0080212 | A1 |   | 4/2005 | Jing |
| 2006/0052548 | A1 |   | 3/2006 | Nishimura |
| 2007/0282022 | A1 |   | 12/2007 | Lousenberg |
| 2009/0182066 | A1 |   | 7/2009 | Yang |
| 2009/0221759 | A1 |   | 9/2009 | Haring |

FOREIGN PATENT DOCUMENTS

| CN | 101709101 | 5/2010 |
| CN | 101733006 | 6/2010 |
| CN | 101733020 | 6/2010 |

(Continued)

OTHER PUBLICATIONS

Fan-Hong, "Studies on sulfinatodehalogenation. XXIX. The sulfinatodehalogenation of primary polyfluoroalkyl iodides and bromides by sodium disulfite", Journal of Fluorine Chemistry, Jun. 1994, vol. 67, No. 3, pp. 233-234.

Huang "Studies on the deiodo-sulfination, Part I, Studies on the deiodo-sulfination of Perfluoroalkyl iodides", Journal of Fluorine Chemistry, Aug. 1983, vol. 23, No. 2, pp. 193-204.

Huang "Studies on the deiodo-sulfination, Part II The Reactions of Perfluoroalkane Sulfinates Perfluorosulfonic Acid", Journal of Fluorine Chemistry, Aug. 1983, vol. 23, No. 2, pp. 229-240.

Huang, "Studies on dehalo-sulfination dechloro-sulfination reaction of carbon tetrachloride and 1,1,1-trichloropolyfluoroalkanes", Acta Chimica Sinica., 1984, vol. 42, No. 10, pp. 1114-1115.

Huang, "Studies on sulfinato-dehalogenation iii. The sulfinato-dehalogenation of primary perfluoroalkyl iodides and α,\o\-perfluoroalkylene diiodides by sodium dithionite", Acta Chim. Sinica, 1985, vol. 43, No. 7, pp. 663-668.

(Continued)

*Primary Examiner* — Nicole M Buie-Hatcher
(74) *Attorney, Agent, or Firm* — Julie Lapos-Kuchar

(57) ABSTRACT

Described herein is a composition comprising a fluorinated polysulfinic acid or a salt thereof having the following formula (I):

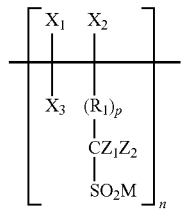

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group; $Z_1$ and $Z_2$ are independently selected from Br, Cl, I, F, $CF_3$, and a perfluorinated alkyl group; M is a cation; p is 0 or 1; and n is at least 2. Also described is a method of making the partially fluorinated polysulfinic acid or salt thereof.

19 Claims, No Drawings

(56) References Cited

FOREIGN PATENT DOCUMENTS

| | | |
|---|---|---|
| JP | 56-057832 | 5/1981 |
| JP | 2004018425 A * | 1/2004 |
| JP | 2006-131588 | 5/2006 |
| WO | WO 97/02300 | 1/1997 |
| WO | WO 01/96268 | 12/2001 |
| WO | WO 2012/082695 | 6/2012 |

OTHER PUBLICATIONS

Huang, "Studies on sulfinatodehalogenation iv. The sulfinatodebromination primary perfluoroalkyl bromides and perfluoroalkylene α,\o\-dibromides", Acta Chim. Sinica, 1986, No. 1, pp. 69-72.

Huang, "Studies on sulfinatodehalogenation VI. The sulfinatodeiodination of primary perfluoroalkyl iodides containing polar substituents", Acta Chim. Sinica, 1986, vol. 44, No. 2, pp. 173-177.

Huang, "Studies on sulfinatodehalogenation XIII. Synthesis of 2-perfluoroalkyl-2-deoxy-*D*-glucose, mono- and poly-*O*-polyfluoroalkylated-*D*-glucoses", Chinese Journal of Chemistry, Jul. 1991, vol. 9, No. 4, pp. 351-359.

International Search Report for PCT International Application No. PCT/US2011/064136, Mailed Feb. 29, 2012, 3 pages.

\* cited by examiner

PARTIALLY FLUORINATED POLYSULFINIC ACIDS AND THEIR SALTS

TECHNICAL FIELD

The present disclosure relates to partially fluorinated polysulfinic acids and salts thereof. Also described are methods of making such partially fluorinated polysulfinic acids and salts thereof.

BACKGROUND

In the polymerization of fluoromonomers, traditionally the monomers are added to a kettle along with an initiator, to initiate the polymerization, as well as a solvent, and in the case of aqueous emulsion polymerization, the polymerization is carried out in water and typically in the presence of an emulsifier in order to stabilize the emulsion.

Fluorinated sulfinic acids and their salts have been used to initiate polymerization. The fluorinated sulfinic acids and their salts have been used along with oxidizing agents during polymerization of fluoromonomers as a means for achieving perfluorinated end groups, which may offer the advantages of more stability, improved performance, etc. by reducing or eliminating the less stable polar end-groups. As disclosed in Grootaert (U.S. Pat. No. 5,285,002), the fluorinated sulfinic acid or salt thereof reacts with an oxidizing agent to generate a fluorinated alkyl radical via electron transfer, which then initiates the polymerization of monomers.

Various papers have described how to prepare fluorinated sulfinic acids or their salts by reduction of sulfonyl fluoride with different reducing agents or by dehalosulfination reaction from fluorinated halides. Examples of different reducing agents used to reduce a sulfonyl fluoride are $NH_2NH_2$ as described in U.S. Pat. No. 2,950,317 (Brown et al.), $M_2SO_3$ and $NaBH_4$ as described in U.S. Pat. No. 5,285,002 (Grootaert), and $K_2SO_3$ as described in U.S. Pat. No. 5,639,837 (Farnham et al.). Examples of a dehalosulfination reaction from fluorinated halides are described by Huang et al. in Journal of Fluorine Chemistry, vol. 23 (1983) p. 193-204 and p. 229-240; by Huang et al. in Chinese Journal of Chemistry, vol. 9 (1991) p. 351-359, and Fan-Hong et al., in Journal of Fluorine Chemistry, vol. 67 (1994) 233-234.

SUMMARY

There is a desire to identify alternative methods for initiating polymerization of fluoromonomers. There is also a desire to identify novel compositions and methods of making, which would enable the ability to change the molecular weight or architecture (e.g., linear or branch) of a polymer. These novel compositions may improve the processing of fluoropolymer polymerization (e.g., by reducing processing step) and/or may improve the finished properties (performance, etc.) of a polymerized fluoropolymer.

In one aspect, a composition is disclosed comprising the following formula (I):

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group, $Z_1$ and $Z_2$ are independently selected from Br, Cl, I, F, $CF_3$, and a perfluoroalkyl group; M is a cation; p is 0 or 1; and n is at least 2.

In one embodiment, the composition further comprising:

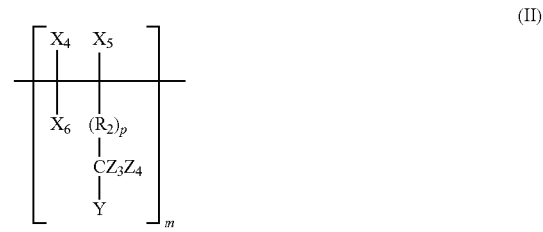

wherein $X_4$, $X_5$, and $X_6$ are independently selected from H, F, Cl, Br, I, $CF_3$, and $CH_3$; $R_2$ is a linking group; $Z_3$ and $Z_4$ are independently selected from Br, Cl, F, $CF_3$, and a perfluoroalkyl vinyl group; Y is selected from —H, —Br, —COOM, —$SO_3M$, and —$[CX_1X_3$—$CX_2(R_1CZ_1Z_2Y_1)]q$, where $Y_1$ is selected from —H, —Br, —COOM, —$SO_3M$, —$SO_2M$, and —$[CX_1X_3$—$CX_2(R_1CZ_1Z_2Y_1)]q$; M is a organic cation; p is 0 or 1; and m is at least 1 and q is at least 1.

In another aspect, a method for making a composition is described comprising: oligomerizing halofluoroalkene monomer, $CX_7X_9$=$CX_8$—$(R_3)_p$—$CZ_5Z_6$—Y, with a sulfinating system to produce the composition of formula (I), wherein $X_7$, $X_8$, and $X_9$ are independently selected from H, F, Cl, Br, I, $CF_3$, and $CH_3$, and wherein at least one of $X_7$, $X_8$, and $X_9$ is H; and $R_3$ is a linking group; $Z_5$ and $Z_6$ are independently selected from Br, Cl, I, F, $CF_3$, and a perfluoroalkyl group; p is 0 or 1; and Y is selected from I, Br, and Cl.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"linking group" refers to a divalent linking group. In one embodiment, the linking group includes at least 1 carbon atom (in some embodiments, at least 2, 4, 8, 10, or even 20 carbon atoms). The linking group can be a linear or branched, cyclic or acyclic structure, that may be saturated or unsaturated, substituted or unsubstituted, and optionally contains one or more hetero-atoms selected from the group consisting of sulfur, oxygen, and nitrogen, and/or optionally contains one or more functional groups selected from the group consisting of ester, amide, sulfonamide, carbonyl, carbonate, urethane, urea, and carbamate. In another embodiment, the linking group does not comprise a carbon atom and is a catenary heteroatom such as oxygen, sulfur, or nitrogen; and "perfluoroalkyl group as used herein, refers to a perfluorinated carbon group comprising that may be linear or branched and may comprise 2, 3, 4, 6, 8, 10, 12, 18, or even 20 carbon atoms.

Also,

as used herein, refers to a segment X (e.g., a monomer) in a compound, such as in an oligomer. In this instance, "n" refers to the number of times segment X is repeated in the compound and may include either random or block copolymer configurations. For example, in

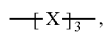

then the compound would include block copolymer and random copolymer configurations, for example, —XXXYYY— as well as —XYXYXY— or —YXXYXY—.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

In the present disclosure, it has been found that a halofluorinated olefin can be oligomerized during a dehalosulfination process. In some instances, the resulting product is an oligomer.

In the present disclosure, a halofluoroalkene monomer according to formula III is used:

$$CX_7X_9=CX_8-(R3)_p-CZ_5Z_6-Y \quad (III)$$

wherein $X_7$, $X_8$, and $X_9$ are independently selected from H, F, Cl, Br, I, $CF_3$, and $CH_3$, and wherein at least one of $X_7$, $X_8$, and $X_9$ is H; R3 is a linking group; $Z_5$ and $Z_6$ are independently selected from Br, Cl, I, F, $CF_3$, and a perfluoroalkyl group; p is 0 or 1; and Y is selected from I, Br, and Cl.

$R_3$ may be non-fluorinated (no hydrogens are replaced by fluorine atoms), partially fluorinated (some of the hydrogens are replaced by fluorine atoms) or perfluorinated (all of the hydrogens are replaced by fluorine atoms). In some embodiments, a hydrogen atom is replaced with a halogen other than fluorine, such as a chlorine, a bromine, or an iodine atom, or a combination thereof. $R_3$ may or may not comprise double bonds. $R_3$ may be substituted or unsubstituted, linear or branched, cyclic or acyclic, and may optionally comprise a functional group (e.g., esters, ethers, ketones, amines, halides, etc.).

In another embodiment, $R_3$ is a catenary heteroatom such as oxygen, sulfur, or nitrogen.

Exemplary monomers according to formula III include: $BrCF_2CH=CH_2$, $ICF_2CH=CH_2$, $BrCF_2OCH=CH_2$, $BrCF_2CH=CHF$, $ICF_2CH=CHF$, $BrCF_2CH=CHBr$, $ICF_2CH=CHBr$, $BrCF_2CBr=CH_2$, $ICF_2CBr=CH_2$, $BrCF_2CF_2CH=CH_2$, $ICF_2CF_2CH=CH_2$, $CBr_3CF_2CF_2CH=CH_2$, $CCl_3CF_2CF_2CH=CH_2$, $BrCF_2CF_2CBr=CH_2$, $ICF_2CF_2CBr=CH_2$, $BrCF_2CF_2CH=CHF$, $ICF_2CF_2CH=CHF$, $BrCF_2CF_2CH=CHCl$, $ICF_2CF_2CH=CHCl$, $BrCF_2CF_2CCl=CH_2$, $ICF_2CF_2CCl=CH_2$, $BrCF_2CF_2CCl=CHCl$, $ICF_2CF_2CCl=CHCl$, $BrCF_2CF_2CH=CHBr$, $ICF_2CF_2CH=CHBr$, $ICF_2CF_2CH_2CH=CH_2$, $BrCF_2CF_2CH_2CH=CH_2$, $ICF_2CF_2CH_2CH=CHF$, $BrCF_2CF_2CH_2CH=CHF$, $ICF_2CF_2CH_2CH=CHBr$, $BrCF_2CF_2CH_2CH=CHBr$, $ICF_2CF_2CH_2CH_2CH=CH_2$, $BrCF_2CF_2CH_2CH_2CH=CH_2$, $ICF_2CF_2CH_2CH_2CH=CHBr$, $BrCF_2CF_2CH_2CH_2CH=CHBr$, $ICF_2CF_2CF_2CF_2CH=CH_2$, $BrCF_2CF_2CF_2CF_2CH=CH_2$, $BrCF_2CF_2CF(CF_3)CF_2CH=CH_2$, $ICF_2CF_2CF_2CF_2CH=CHBr$, $BrCF_2CF_2CF_2CF_2CH=CHBr$, $ICF_2CF_2CF_2CF_2CH_2CH=CH_2$, $BrCF_2CF_2CF_2CF_2CH_2CH=CH_2$, $BrCF_2CF_2CF_2CF_2CH_2C(CH_3)=CH_2$, $ICF_2CF_2CF_2CF_2CH_2CBr=CH_2$, $BrCF_2CF_2CF_2CF_2CH_2CBr=CH_2$, $ICF_2CF_2CF_2CF_2CH_2CH=CHBr$, $BrCF_2CF_2CF_2CF_2CH_2CH=CHBr$, and $ICF_2CF_2OCF_2CF_2CH=CH_2$.

In one embodiment, the halofluoroalkene monomer is of the following formula IIIb: $CH_2=CH-Rf-Y$, wherein Rf is perfluorinated alkylene and Y is I or Br.

In the present disclosure, the halofluoroalkene monomer according to formula III is contacted with a sulfinating agent, which then undergoes a dehalosulfination reaction. This sulfinating agent is selected from the group of compounds known to be able to replace a halide with a sulfinate group and includes, for example, $Na_2S_2O_4$, $NaHSO_3/(NH_4)_2Ce(NO_3)_6$, $NaHSO_3/FeCl_3$, $NaHSO_3/K_3[Fe(CN)_6]$, $HOCH_2SO_2Na$, $(NH_2)_2CSO_2$, $Na_2S_2O_5$, and combinations thereof.

Although not wanting to be bound by theory, it is believed that the sulfinating agent in solution decomposes or hydrolyzes to generate a radical, a radical anion, a reducing agent intermediate, or a combination thereof in the presence of heat (even at room temperature), light, etc., which is unstable or highly reactive. This reactive intermediate species then reacts with the halofluoroalkene monomer according to formula III to form a new radical either via the halide endgroup or the carbon-carbon double-bond, which ultimately oligomerizes to form an oligomer having a segment according to formula (I):

wherein $X_1$, $X_2$, and $X_3$ are independently selected from H, F, Cl, Br, I, $CF_3$, and $CH_3$ and wherein at least one of $X_1$, $X_2$, and $X_3$ is H; $R_1$ is a linking group; $Z_1$ and $Z_2$ are independently selected from Br, Cl, I, F, $CF_3$, and a perfluoroalkyl group; M is a cation; p is 0 or 1; and n is at least 2, 3, 4, 5, 10, 20, etc.

$R_1$ may be non-fluorinated, partially fluorinated, or perfluorinated. In some embodiments, the hydrogen atom is replaced with a halogen other than fluorine, such as a chlorine, a bromine, or an iodine atom, or a combination thereof. $R_1$ may or may not comprise double bonds. $R_1$ may be substituted or unsubstituted, linear or branched, cyclic or acyclic, and may optionally comprise a functional group (e.g., esters, ethers, ketones, amines, halides, etc.).

In one embodiment of the compound according to formula I, $X_1$, $X_2$, and $X_3$ are all H, and $R_1$ is a perfluorinated alkylene.

In one embodiment of the compound according to formula I, $R_1$ is selected from: $-(CH_2)_a-$, $-(CF_2)_a-$, $-(CF_2)_a-O-(CF_2)_b-$, and $-(CF_2)_a-[O-(CF_2)_b-]_c-$, $-[(CF_2)_a-O-]_b-[(CF_2)_c-O-]_d-$, and combinations thereof, wherein a, b, c, and d are independently at least 1, 2, 3, 4, 10, 20, etc.

In another embodiment, $R_1$ is a catenary heteroatom such as oxygen, sulfur, or nitrogen.

M in formula I may comprise $H^+$; inorganic cations including, but not limited to: $Na^+$, $Li^+$, $Cs^+$, $Ca^{+2}$, $K^+$, $NH_4^+$, $Mg^{+2}$, $Zn^{+2}$, and $Cu^{+2}$; and/or organic cations including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, and $((CH_3CH_2CH_2CH_2)_4)P^+$.

Exemplary compounds according to formula I include: $-[CH_2CH(CF_2CF_2SO_2Na)]_n-$, $-[CH_2CH(CF_2CF_2SO_2K)]_n-$, $-[CH_2CH(CF_2CF_2SO_2NH_4)]_n-$, $-[CH_2CH(CF_2CF(CF_3)SO_2Na)]_n-$, $-[CH_2CH(CF_2CF(CF_3)SO_2K)]_n-$, $-[CH_2CH(CF_2CF(CF_3)SO_2NH_4)]_n-$, $-[CH_2CH(CF_2CF(CF_3)SO_2H)]_n-$, $-[CH_2CH(CF_2SO_2Na)]_n-$, $-[CH_2CH(CF_2SO_2K)]_n-$, $-[CH_2CH(CF_2SO_2NH_4)]_n-$, $-[CH_2CH(CF_2SO_2H)]_n-$, $-[CH_2CH(CF_2CF_2CF_2CF_2SO_2Na)]_n-$, $-[CH_2CH(CF_2CF_2CF_2CF_2SO_2K)]_n-$, $-[CH_2CH(CF_2CF_2CF_2CF_2SO_2NH_4)]_n-$, $-[CH_2CH(CF_2CF_2CF_2CF_2SO_2H)]_n-$, $-[CH_2CH(CF_2CF_2OCF_2CF_2SO_2Na)]_n-$, $-[CH_2CH(CF_2CF_2OCF_2CF_2SO_2K)]_n-$, $-[CH_2CH(CF_2CF_2OCF_2CF_2SO_2NH_4)]_n-$, $-[CH_2CH(CF_2CF_2OCF_2CF_2SO_2H)]_n-$, $-[CH_2CH(CH_2CF_2CF_2SO_2Na)]_n-$, $-[CH_2CH(CH_2CF_2CF_2SO_2K)]_n-$, $-[CH_2CH(CH_2CF_2CF_2SO_2H)]_n-$, $-[CH_2CH(CF_2CF_2SO_2H)]_n-$, and $-[CH_2CH(CF_2CF_2OCF_2CF_2SO_2H)]_n-$, where n is no more than 100, 50, 25, or 10.

In one embodiment, the mole ratio of halofluoroalkene monomer according to formula III and the sulfinating agent used in the reaction of the present disclosure is from 1:0.5 to 1:4, preferably 1:1 to 1:2.

Because both ends of the halofluoroalkene monomer according to formula III may be susceptible to radical reaction (i.e., the carbon-carbon double bond and the bromine or iodine), various radical intermediates may be generated, including different fluorinated carbon radicals, $-CF_2\cdot$, and different non-fluorinated carbon radicals, $-CX_4X_6-CX_5(R_2CZ_3Z_4Y)$. Correspondingly, various reactions, including by-reactions, via these reactive radicals may occur when the monomer according to formula III is reacted with a sulfinating agent. For example, the resulting composition may also comprise segments according to formula II

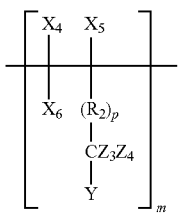

(II)

wherein $X_4$, $X_5$, and $X_6$ are independently selected from H, F, Cl, Br, I, $CF_3$, and $CH_3$; $R_2$ is a linking group; $Z_3$ and $Z_4$ are independently selected from Br, Cl, I, F, $CF_3$, and a perfluoroalkyl group; Y is selected from $-H$, $-Br$, $-I$, $-COOM$, $-SO_3M$, $-SO_2M$, and $-[CX_1X_3-CX_2(R_1CZ_1Z_2Y_1)]q$, where $Y_1$ is selected from $-H$, $-Br$, $-COOM$, $-SO_3M$, $-SO_2M$, and $-[CX_1X_3-CX_2(R_1CZ_1Z_2Y_1)]q$; M is a cation; m is at least 1, 2, 3, 4, 5, 10, 20, etc.; p is 0 or 1; and q is at least 1, 2, 3, 4, 5, 10, 20, etc.

$R_2$ may be non-fluorinated, partially fluorinated, or perfluorinated. In some embodiments, the hydrogen atom is replaced with a halogen other than fluorine, such as a chlorine, a bromine or an iodine atom, or a combination thereof. $R_2$ may or may not comprise double bonds. $R_2$ may be substituted or unsubstituted, linear or branched, cyclic or acyclic, and may optionally comprise a functional group (e.g., esters, ethers, ketones, amines, halides, etc.).

In another embodiment, $R_2$ is a catenary heteroatom such as oxygen, sulfur, or nitrogen.

In one embodiment, the segment of formula II, may be identical to the segment of formula I (e.g., $X_1=X_4$, $R_1=R_2$, etc.), except that the $-SO_2M$ is replaced with a $-Y$ as defined above. In another embodiment, the segment of formula II, may be different than the segment of formula I, due to the multiple reactive sites of the halofluoroalkene monomer of formula III.

Not only does the sulfinating agent reduce or eliminate polar terminal end-groups, due to the multiple reactive sites of the halofluoroalkene monomer of formula III and the resulting oligomer, in addition, branched polysulfinate oligomers may be obtained.

Additional monomers may be introduced into the polymerization reaction to adjust the properties of the resulting oligomer. For example additional monomers may be used to adjust the molecular weight or to change the hydrophobic/hydrophilic nature of the resulting product. In one embodiment, the reaction of a halofluoroalkene monomer according to formula III with a sulfinating agent further comprises a second monomer.

Advantageously, a second monomer may be added to the halofluoroalkene monomer of formula III to generate a copolymers (or a cooligomer). In other words, the reaction product may comprise a segment according to formula IV:

 (IV)

wherein Q is derived from a second monomer and p is at least 1, 2, 3, 4, 5, 10, 20, etc. Generally, the amount of second monomer is selected such that the ratio to halofluoroalkene monomer according to formula III is 1:100 to 10:1 by weight.

The second monomer may be selected from a non-fluorinated olefin, a partially fluorinated olefin, and a perfluorinated olefin.

In one embodiment, the second monomer is a compound selected from the following formula: $CX_2=CX(Z)$, wherein each X is independently selected from H or F; and Z is selected from I, Br, and $R_f-U$ wherein U=I or Br, and $R_f$ is a perfluorinated or partially perfluorinated alkylene group optionally containing O atoms.

In another embodiment, the second monomer may be selected from non-fluorinated bromo- or iodo-olefins.

Exemplary second monomers include, ethylene, tetrafluoroethylene, propylene, hexafluoropropylene, vinyl chloride, vinyl fluoride, vinyl iodide, allyl iodide, a fluoroalkyl substituted ethylene, vinylidene fluoride, fluorinated alkyl vinyl ethers, fluorinated alkoxy vinyl ethers, bromotrifluoroethylene, chlorotrifluoroethylene, and combinations thereof.

Additional exemplary second monomers include: $CF_3CH=CH_2$, $C_4F_9CH=CH_2$, $CF_3OCF=CF_2$, $C_3F_7OCF=CF_2$, $CH_2=CHCF_2SO_2F$, $CH_2=CHCF_2CFOCF_2CF_2SO_2F$, $CH_2=CH(CF_2)_4SO_2F$, $CF_2=CFOCF_2CF_2SO_2F$, $CF_2=CFOCF_2CF(CF_3)SO_2F$, $CF_2=CFO(CF_2)_4SO_2F$, $CF_2=CFOCF_2CFOCF_2CF_2SO_2F$, $CF_2=CFOCF_2CF(CF_3)OCF_2CF_2SO_2F$, $CF_2=CFOCF_2CF_2CO_2CH_3$, $CF_2=CFO(CF_2)_4CO_2CH_3$, $CF_2=CFOCF_2CF(CF_3)OCF_2CF_2CO_2CH_3$, $CF_2=CFOCF_2CF_2CF_2OCF_3$, $CH_2=CHCF_2CF_2COONH_2$, $CF_2=CFOCF_2CFOCF_2CF_2P(O)(OR)_2$, $CF_2=CFO(CF_2)_3I$, $CF_2=CFO(CF_2)_5CN$, $CH_2=CHCF_2CN$, $CH_2=CH(CF_2)_2CN$, $CF_2=CF(CF_2)_2CF_2Br$, $CHBr=CF_2$, $CF_2=CFO(CF_2)_5CH_2OH$, $CF_2=CFO(CF_2)_2Br$, $CH_2=CHCF_2CF_2—CH_2OH$, $CH_2=CHI$, $CF_2=CHI$, $CF_2=CFI$, $CH_2=CHCH_2I$, $CF_2=CFCF_2I$, $CH_2=CHCF_2CF_2I$, $CH_2=CHCF_2CF_2CH_2CH_2I$, $CH_2=CH(CF_2)_4I$, $CH_2=CH(CF_2)_4CH_2CH_2I$, $CH_2=CH(CF_2)_6I$, $CH_2=CH(CF_2)_6CH_2CH_2I$, $CF_2=CFCH_2CH_2I$, $CF_2=CFCF_2CF_2I$, $CF_2=CFOCF_2CF_2I$, $CF_2=CFOCF_2CF_2CH_2CH_2I$, $CF_2=CFOCF_2CF_2CF_2I$, $CF_2=CFOCF_2CF_2CF_2CH_2CH_2I$, $CF_2=CFOCF_2CF_2CH_2I$, $CF_2=CFOCF_2CF_2CF_2CH_2I$, $CF_2=CFCF_2OCH_2CH_2I$, $CF_2=CFO(CF_2)_3—OCF_2CF_2I$, $CH_2=CHBr$, $CF_2=CHBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and combinations thereof.

In one embodiment, additional (e.g., third, forth, fifth, etc.) monomers selected from a non-fluorinated olefin, a partially fluorinated olefin, a perfluorinated olefin, and combinations thereof, may be added to the reaction.

In one embodiment, reaction product of the halofluoroalkene monomer according to formula III with a sulfinating agent is water soluble, meaning that at least 20%, 30% or even 40% (by weight) of the solids are dispersible in water.

In preparing the product according to the present disclosure, the dehalosulfination reaction is done in the presence of a solvent. In one embodiment, the solvent is water. An organic co-solvent compatible with water, such as acetonitrile, ketone, ether, amide or sulfone may also be used. An organic co-solvent compatible with water may enable a fast reaction as a result of the improved compatibility with a water soluble inorganic sulfinating agent, such as thionite, and the monomers which may be soluble in organic solvent, but not soluble in water.

The reaction of the present disclosure may be performed in a buffered solution. For example, the reaction may be buffered at a pH greater than 2, 4, 6 or even 8 to slow the decomposition of the sulfinate. Exemplary buffers systems include carbonate, bicarbonate, phosphate, citrate, acetate, and borax solutions. In one embodiment, a base, such as $NaHCO_3$ may be used to prevent the pH from lowering, causing a highly acidic solution.

In one embodiment, no additional oxidizing agent is added to reaction as disclosed herein. An oxidizing agent (e.g., ammonium persulfinate) is known to those skilled in the art and is not particularly limited.

In one embodiment of the present disclosure, a phase transfer catalyst may be used. Typically, a phase transfer catalyst is used to assist the reaction between a water soluble reactant and an organic soluble reactant. Exemplary phase transfer catalysts include: tetra-n-octylammonium halides, and tetramethyl ammonium halides, tetrabutyl ammonium halides, benzyl triphenyl phosphonium halides, 18-crown-6, polyethylene glycol 400, and combinations thereof.

In the present disclosure, the reaction of the hydrofluoroalkene monomer of formula III and the sulfinating agent may be conducted at a temperature of between at least 10, 20, 25, 30, or even 35° C.; at most 90, 100, or even 110° C. Typically, the reaction occurs in less than about 30 minutes, 1 hour, 2 hours, 4 hours, or even 8 hours; at most about 4 hours, 6 hours, 8 hours, 10 hours, or even 24 hours, depending the activity of halide. For example, the iodofluorinated monomer is highly reactive to $Na_2S_2O_4$ and the reaction is completed in 30 minutes, whereas the less reactive bromofluorinated monomer requires a higher temperature (up to 60° C.) and longer time, e.g., up to 24 hours.

In one embodiment, the reaction of the halofluoroalkene monomer of formula III and the sulfinating agent is conducted in an oxygen-free atmosphere (such as bubbling the solution with nitrogen, then either reacting under nitrogen or in a sealed reactor) to prevent oxygen from inhibiting or slowing the reaction, or to convert any generated fluorinated radicals into —$CO_2M$.

The resulting product of the present disclosure may be isolated and optionally purified by known methods. In one embodiment, the crude product is isolated from the reaction mixture by filtration to remove insoluble inorganic salts, rotary evaporation to remove solvent to give sulfinate salt solid. In another embodiment, the crude solid is purified by extracting with warm alcohol, such as isopropanol to remove insoluble inorganic impurity followed by the stripping out of solvent. In another embodiment, the addition of a concentrated acid, such as, for example, sulfuric acid, is added to protonate the sulfinate salt resulting in a phase split. In another embodiment, the crude product is isolated by the addition of an acid, such as, for example, sulfuric acid, followed by extraction with an organic solvent, such as t-butyl methyl ether and diethyl ether. The desired product in acid form then is isolated by removal of the organic solvent.

In some embodiments further purification of the crude product is sometimes not necessary. The elimination of the purification step may reduce processing time and cost. If desired, the reaction mixture or crude product may be purified, for example, by repeated recrystallization.

In one embodiment, the reaction product of the hydrofluoroalkene monomer of formula III and the sulfinating agent may comprise a majority of segments corresponding to formula III. Wherein a majority means at least 50, 60, 70 or even 80% by weight of the final product comprises segments corresponding to formula III.

In one embodiment, the resulting oligomers prepared according to the present disclosure have a number average molecular weight of no more than 20,000 grams/mole, 15,000 grams/mole, 10,000 grams/mole, 5,000 grams/mole, 2,000 grams/mole, 1000 grams/mol, or even 500 grams/mole.

Advantageously, the reaction product of the present disclosure comprises oligomers that have for example, at least 2, 3, 5, 7, or 10 sulfinate groups off of the oligomer chain.

However, the reaction product of the hydrofluoroalkene monomer of formula III and the sulfinating agent may comprise other segments as disclosed above including comonomers, and segments corresponding to formula IV.

The reaction product of the present disclosure may be useful as a surfactant (emulsifier), a dispersion stabilizer, or an initiator.

Advantageously, the compounds of the present disclosure may be useful as an initiator for polymers having fewer undesired end-polar groups, or as a polymerizable surfactant, thus eliminating the need to remove the surfactant post-polymerization.

Embodiments of the present disclosure include:

Embodiment 1

A composition comprising the following formula (I):

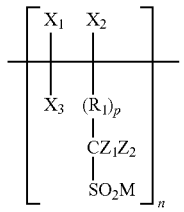

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group; $Z_1$ and $Z_2$ are independently selected from Br, Cl, I, and F, $CF_3$, and a perfluorinated alkyl group; M is a cation; p is 0 or 1; and n is at least 2.

Embodiment 2

The composition according to embodiment 1, further comprising:

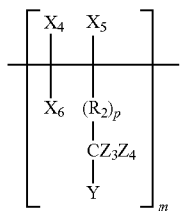

wherein $X_4$, $X_5$, and $X_6$ are independently selected from H, F, Cl, Br, I, $CF_3$, and $CH_3$; $R_2$ is linking group; $Z_3$ and $Z_4$ are independently selected from Br, Cl, F, $CF_3$, and a perfluorinated alkyl group; Y is selected from —H, —Br, —I, —COOM, —$SO_3$M, and —[$CX_1X_3$—$CX_2(R_1CZ_1Z_2Y_1)$]q, where $Y_1$ is selected from —H, —Br, —COOM, —$SO_3$M, —$SO_2$M, and —[$CX_1X_3$—$CX_2(R_1CZ_1Z_2Y_1)$]q; M is a cation; p is 0 or 1; and m is at least 1 and q is at least 1.

Embodiment 3

The composition according to any one of the previous embodiments, further comprising:

wherein Q is derived from a monomer and p is at least 1.

Embodiment 4

The composition according to embodiment 3, wherein the monomer is selected from a non-fluorinated olefin, a partially fluorinated olefin, a perfluorinated olefin, and combinations thereof.

Embodiment 5

The composition according to any one of embodiments 3-4, wherein the monomer is selected from the following formula: $CX_2$=$CX(Z)$, wherein each X is independently selected from H or F; and Z is selected from I, Br, and $R_f$—U wherein U=I or Br, and $R_f$ is a perfluorinated or partially perfluorinated alkylene group optionally containing O atoms.

Embodiment 6

The composition according to any one of embodiments 3-5 wherein the monomer is selected from: ethylene, tetrafluoroethylene, propylene, hexafluoropropylene, vinyl chloride, vinyl fluoride, a fluoroalkyl substituted ethylene, vinylidene fluoride, allyl iodide, fluorinated alkyl vinyl ethers, fluorinated alkoxy vinyl ethers, bromotrifluoroethylene, chlorotrifluoroethylene, $CF_3CH$=$CH_2$, $C_4F_9CH$=$CH_2$, $CH_2$=$CHCF_2CFOCF_2CF_2SO_2F$, $CF_3OCF$=$CF_2$, $C_3F_7OCF$=$CF_2$, $CF_2$=$CFO(CF_2)_4SO_2F$, $CF_2$=$CFOCF_2CFOCF_2CF_2SO_2F$, $CF_2$=$CFOCF_2CF(CF_3)OCF_2CF_2SO_2F$, $CF_2$=$CFOCF_2CF(CF_3)OCF_2CF_2CO_2CH_3$, and $CF_2$=$CFOCF_2CF_2CF_2OCF_3$

Embodiment 7

The composition according to any one of the previous embodiments, wherein the composition has a number average molecular weight of no more than 20,000 grams/mole.

Embodiment 8

The composition according to any one of the previous embodiments, wherein the $X_1$, $X_2$, and $X_3$ are all H, and $R_1$ is a perfluorinated alkylene.

Embodiment 9

The composition according to any one of the previous embodiments, wherein $R_1$ is selected from: —$(CH_2)_a$—, —$(CF_2)_a$—, —$(CF_2)_a$—O—$(CF_2)_b$—, and —$(CF_2)_a$—[O—$(CF_2)_b$]$_e$—, —[$(CF_2)_a$—O—]$_b$—[$(CF_2)_c$—O—]$_d$, and combinations thereof, wherein a, b, c, and d are independently at least 1.

Embodiment 10

The composition according to any one of the previous embodiments, wherein M is selected from: $H^+$, $NH_4^+$, $N(CH_3)_4^+$, $Na^+$, $K^+$, $Cs^+$, $Ca^{+2}$, $Mg^{+2}$, $Zn^{+2}$, and combinations thereof.

Embodiment 11

The composition according to any one of the previous embodiments, wherein the composition is water soluble.

Embodiment 12

A method for making a composition comprising: oligomerizing a halofluoroalkene monomer, $CX_7X_9$=$CX_8$—$(R_3)_p$—$CZ_5Z_6$—Y, with a sulfinating agent to produce the composition of formula (I), wherein $X_7$, $X_8$, and $X_9$ are independently selected from H, F, Cl, Br, I, $CF_3$, and $CH_3$, and wherein at least one of $X_7$, $X_8$, and $X_9$ is H; and $R_3$ is a linking group; $Z_5$ and $Z_6$ are independently selected from Br, Cl, I, F, $CF_3$, and a perfluoroalkyl group; p is 0 or 1; and Y is selected from I, Br, and Cl.

Embodiment 13

The halofluoroalkene monomer of embodiment 12 is selected from $BrCF_2CH=CH_2$, $ICF_2CH=CH_2$, $BrCF_2CF_2CH=CH_2$, $ICF_2CF_2CH=CH_2$, $CBr_3CF_2CF_2CH=CH_2$, $CCl_3CF_2CF_2CH=CH_2$, $ICF_2CF_2CH_2CH=CH_2$, $BrCF_2CF_2CH_2CH=CH_2$, $ICF_2CF_2CF_2CF_2CH=CH_2$, $BrCF_2CF_2CF_2CF_2CH=CH_2$, $ICF_2CF_2CF_2CF_2CH_2CH=CH_2$, and $BrCF_2CF_2CF_2CF_2CH_2CH=CH_2$.

Embodiment 14

The method according to embodiment 12, further comprising a second monomer, and the second monomer is selected from non-fluorinated olefin, a partially fluorinated olefin, and a perfluorinated olefin.

Embodiment 15

The method according to embodiment 12, further comprising a solvent.

Embodiment 16

The method according to embodiment 15, wherein the solvent is water.

Embodiment 17

The method according to any one of embodiments 12-16, further comprising a buffer system.

Embodiment 18

The method according to embodiment 17, wherein the buffer system is buffered at a pH greater than 2.

Embodiment 19

The method according to embodiment 17, wherein the buffer system comprises bicarbonate.

Embodiment 20

The method according to any one of embodiments 12-19, wherein no oxidizing agent is added during the oligomerization.

Embodiment 21

The method according to any one of embodiments 12-20, wherein the sulfinating system is selected from: $Na_2S_2O_4$, $NaHSO_3/(NH_4)_2Ce(NO_3)_6$, $NaHSO_3/FeCl_3$, $NaHSO_3/K_3[Fe(CN)_6]$, $HOCH_2SO_2Na$, $(NH_2)_2CSO_2$, $Na_2S_2O_5$, and combinations thereof.

Embodiment 22

The method according to any one of embodiments 12-21, wherein the oligomerizing is conducted at a temperature of between 20 to 100° C.

Embodiment 23

The method according to any one of embodiments 12-22, wherein the oligomerizing is conducted under an oxygen-free atmosphere.

Embodiment 24

The method according to any one of embodiments 12-23, further comprising acidifying and extracting the composition.

Embodiment 25

An article comprising the composition according to any one of the embodiments of 1-11.

Embodiment 26

The article of according to embodiment 25, wherein the article is at least one of: a surfactant, a dispersion stabilizer, or an initiator.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, mm=millimeter, ml=milliliter, L=liter, N=normal, psi=pressure per square inch, MPa=megaPascals, rpm=revolutions per minute, and wt=weight.

| Materials | |
|---|---|
| Material | Source |
| Acetonitrile ($CH_3CN$) | Commercially available from Honeywell Burdick and Jackson, Morristown, NJ |
| $Na_2S_2O_4$ | 85% purity, commercially available from Mallinckrodt Baker Inc, Phillipsburg, NJ |
| $BrCF_2CF_2CH=CH_2$ | Commercially available from SynQuest Lab, Alachua FL |
| $ICF_2CF_2CH=CH_2$ | Commercially available from SynQuest Lab, Alachua FL |
| MV-31 | $CF_3OCF_2CF_2CF_2OCF=CF_2$ made as per Example 8 of U.S. Pat. No. 6,255,536 (Worm et al.) |
| MV4S | $CF_2=CF-O-C_4F_8-SO_2F$, made as described in the Example A to C of U.S. Pat. No. 6,624,328 (Guerra) |
| $C_4F_9CH=CH_2$ | Zonyl PFBE fluorotelomer intermediate, DuPont product, commercially available from Sigma-Aldrich, Milwaukee, WI |
| t-BuOCH$_3$ | t-butyl methyl ether, commercially available from EMD Chemicals Inc., OmniSolv, Gibbstown, NJ |

Example 1

138 g deionized water, 123 g acetonitrile ($CH_3CN$) and 25.6 g $NaHCO_3$ (0.305 mol), were charged into a 600 mL PAAR pressure reactor. The solution was bubbled with nitrogen gas for 2 minutes to remove oxygen. The following materials were then added in order under a nitrogen atmosphere: 50 g $BrCF_2CF_2CH=CH_2$ (0.24 mol) followed with 53.2 g $Na_2S_2O_4$ (0.26 mol) in 4 portions for slow release of generated gas during the addition. The reactor was sealed after addition, and the solution was heated to 60° C. and reacted at 60° C. (internal temperature) for 15 hours. After cooling to 20° C., the pressure was released and the reaction mixture had two separated phases with some solid. 294.8 g liquid was collected after filtration to remove solid.

From $^{19}F$ NMR (nuclear magnetic resonance spectroscopy) analysis of the filtered solution above, very complicated signals were observed between 113 and 134 ppm (chemical shift) indicating the presence of a $—CF_2SO_2Na$ group (normally around −130 ppm). Small signals were also seen for $—CF_2Br$ and $—CF_2H$.

The filtered solution from above was acidified with 1N HCl solution and the solvents were stripped off. The resulting solid was extracted with diethyl ether (five times with 100 g portions). The combined ether extraction solutions were washed with water (two times with 50 g portions). After stripping off the solvent and drying under full vacuum at room temperature overnight, 30.32 g of a red semi-solid was isolated. From FT-IR (Fourier Transform-Infrared) analysis, no double bond signal of $CH_2=CH—$ was observed indicating the oligomerization of the double bond. This solid then was dispersed in water. No unreacted $CH_2=CH—$ was observed from $^1H$ NMR analysis. GPC (gel permeation chromatography, which are expressed in grams/mole relative to polystyrene standards in tetrahydrofuran) showed Mn (number average molar mass)=1400 grams/mole, Mw (weight average molar mass)=1600 grams/mole, and polydispersity (PD)=1.2.

Example 2

13.68 g deionized water, 10.11 g $CH_3CN$ and 2.60 g $NaHCO_3$ (0.031 mol) was charged into a 250 mL flask. The solution was bubbled with nitrogen for 2 minutes. 5.16 g $Na_2S_2O_4$ (0.027 mol) was then added in 3 portions followed by 5.08 g $ICF_2CF_2CH=CH_2$ (0.02 mol). The reaction was conducted at 20° C. with magnetic stirring for 2 hours. From $^{19}F$ NMR, no $—CF_2I$ (~60 ppm) was observed, indicating 100% conversion of the iodide. As in example 1 $^{19}F$ NMR analysis (NMR run in water and acetonitrile) very complicated signals were observed between −113 and −134 ppm indicating the presence of a $—CF_2SO_2Na$ group. By using a similar process to Example 1, 2.1 g of a semi-solid was isolated, which showed no $CH_2=CH—$ signal from FT-IR and $^1H$ NMR analyses.

Example 3

138 g deionized water, 100 g $CH_3CN$ and 25 g $NaHCO_3$ was charged into a 600 ml PAAR pressure reactor. The solution was bubbled with nitrogen gas for 2 minutes to free oxygen. 50 g $BrCF_2CF_2CH=CH_2$ and 10 g $C_4F_9CH=CH_2$ were then added under a nitrogen atmosphere, followed by 58 g $Na_2S_2O_4$. The reactor was sealed and reacted at 60° C. (internal temperature) for 24 hours. After cooling to 20° C., the remaining pressure was released, and 353 g liquid (2 phases) with some solids was obtained. The solution was filtered to remove solids and 115 g of the top clear solution was isolated. By $^{19}F$ NMR fluorinated products were seen in the upper phase, but not the lower phase. Rotary evaporation to remove solvent of the upper phase yielded 33 g of a semisolid. This semisolid was acidified with 2N $H_2SO_4$ to pH ~1, and then extracted twice with 200 mL $t-BuOCH_3$. Solvent was removed from the extracts by rotary evaporation and then the remaining liquid was dried under full vacuum overnight to yield 31.26 g of a clear liquid. From $^{19}F$ NMR analysis, a clear $CF_3—$ signal from $CF_3CF_2CF_2CF_2CH=CH_2$ was observed in comparison with reaction product from pure $BrCF_2CF_2CH=CH_2$ as in Example 1, indicating the copolymerization of $CF_3CF_2CF_2CF_2CH=CH_2$ and $BrCF_2CF_2CH=CH_2$ (any unpolymerized $CF_3CF_2CF_2CF_2CH=CH_2$ should not have remained in the final product after full vacuum stripping due to its low boiling point of 58° C.). As in the $^{19}F$ NMR analysis of Example 1, very complicated signals were observed between −113 and −134 ppm. Signals of $—CF_2SO_2H$ and $—CF_2Br$ were also identified from the isolated product by $^{19}F$ NMR analysis. No $CH_2=CH—$ signal was observed from the isolated product by FT-IR and $^1H$-NMR analyses. The isolated product showed less solubility in water in comparison with that from homo-oligomerization of $BrCF_2CF_2CH=CH_2$ as further evidence of the co-oligomerization with $CF_3CF_2CF_2CF_2CH=CH_2$. GPC analysis showed Mn=810 grams/mole, Mw=990 grams/mole, and PD=1.2.

Example 4

50 g $BrCF_2CF_2CH=CH_2$ and 10 g of MV-31 was reacted with 58 g $Na_2S_2O_4$ and 25 g $NaHCO_3$ in 138 g $H_2O$ and 100 g $CH_3CN$ at 60° C. for 24 hours in a 600 ml PAAR pressure reactor. 33.58 g liquid product was isolated following filtration, phase separation, acidification, extraction, and drying. As in the $^{19}F$ NMR analysis of example 1, very complicated signals were observed between −113 and −134 ppm. From $^{19}F$ NMR analysis new signals of $CF_3OCF_2—$ from $CF_3OCF_2CF_2CF_2OCF=CF_2$ were observed in comparison with reaction product from pure $BrCF_2CF_2CH=CH_2$ as in Example 1 indicating the copolymerization of $CF_3OCF_2CF_2CF_2OCF=CF_2$ and $BrCF_2CF_2CH=CH_2$ (any unpolymerized $CF_3OCF_2CF_2CF_2OCF=CF_2$ should not have remained after vacuum stripping). Signals of $—CF_2SO_2H$ and $—CF_2Br$ were also identified from the isolated product. No unreacted $CH_2=CH—$ signal was observed from the isolated product by FT-IR and $^1H$-NMR analyses. GPC analysis showed Mn=620 grams/mole, Mw=830 grams/mole, and PD=1.5.

Example 5

50 g $BrCF_2CF_2CH=CH_2$ and 10 g of MV4S was reacted with 58 g $Na_2S_2O_4$ and 25 g $NaHCO_3$ in 138 g $H_2O$ and 100 g $CH_3CN$ at 60° C. for 24 hours in a 600 ml PAAR pressure reactor. 38 g of a liquid product was isolated following filtration, phase separation, acidification, extraction and drying. As in the $^{19}F$ NMR analysis of example 1, very complicated signals were observed between −113 and −134 ppm. A small amount $CF_2Br$ was also identified. In addition, a new signal of $—OCF_2—$ from $CF_2=CFOCF_2(CF_2)_3SO_2F$ was observed at −87 ppm in comparison with reaction product from pure $BrCF_2CF_2CH=CH_2$ as in Example 1 supporting the co-oligomerization of $CF_2=CFO(CF_2)_4SO_2F$ with $BrCF_2CF_2CH=CH_2$. Also the $—SO_2F$ signal at +43 ppm disappeared and an extra strong $—CF_2SO_2H$ signal was observed, indicating the conversion of $—SO_2F$ to $—SO_2H$ during the reaction. No double bond signal was observed from the isolated product by FT-IR analysis, indicating the oligomerization of $CH_2=CH-$ and $CF_2=CFO-$ groups.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising the following formula (I):

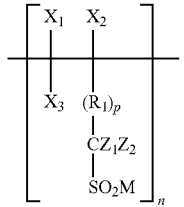

wherein $X_1$, $X_2$, and $X_3$ are all H; $R_1$ is a perfluorinated alkylene optionally comprising O atoms; $Z_1$ and $Z_2$ are independently selected from Br, Cl, I, and F, $CF_3$, and a perfluorinated alkyl group; M is a cation; p is 0 or 1; and n is at least 2.

2. The composition according to claim 1, further comprising:

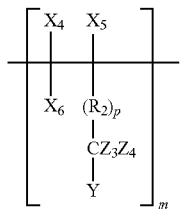

wherein $X_4$, $X_5$, and $X_6$ are independently selected from H, F, Cl, Br, I, $CF_3$, and $CH_3$; $R_2$ is linking group; $Z_3$ and $Z_4$ are independently selected from Br, Cl, F, $CF_3$, and a perfluorinated alkyl group; Y is selected from —H, —Br, —I, —COOM, —$SO_3M$, and —$[CX_1X_3-CX_2(R_1CZ_1Z_2Y_1)]q$, where $Y_1$ is selected from —H, —Br, —COOM, —$SO_3M$, —$SO_2M$, and —$[CX_1X_3-CX_2(R_1CZ_1Z_2Y_1)]q$; M is a cation; p is 0 or 1; and m is at least 1 and q is at least 1.

3. The composition according to claim 1, further comprising:

wherein Q is derived from a monomer and p is at least 1.

4. The composition according to claim 3, wherein the monomer is selected from the following formula: $CX_2=CX$ (Z), wherein each X is independently selected from H or F; and Z is selected from I, Br, and $R_f$—U wherein U=I or Br, and $R_f$ is a perfluorinated or partially perfluorinated alkylene group optionally containing O atoms.

5. The composition according to claim 3, wherein the monomer is selected from: ethylene, tetrafluoroethylene, propylene, hexafluoropropylene, vinyl chloride, vinyl fluoride, a fluoroalkyl substituted ethylene, vinylidene fluoride, allyl iodide, fluorinated alkyl vinyl ethers, fluorinated alkoxy vinyl ethers, bromotrifluoroethylene, chlorotrifluoroehtylene, $CF_3CH=CH_2$, $C_4F_9CH=CH_2$, $CH_2=CHCF_2CFOCF_2CF_2SO_2F$, $CF_3OCF=CF_2$, $C_3F_7OCF=CF_2$, $CF_2=CFO(CF_2)_4SO_2F$, $CF_2=CFOCF_2CFOCF_2CF_2SO_2F$, $CF_2=CFOCF_2CF(CF_3)OCF_2CF_2SO_2F$, $CF_2=CFOCF_2CF(CF_3)OCF_2CF_2CO_2CH_3$, and $CF_2=CFOCF_2CF_2CF_2OCF_3$.

6. The composition according to claim 1, wherein $R_1$ is selected from: —$(CF_2)_a$—, —$(CF_2)_a$—O—$(CF_2)_b$—, and —$(CF_2)_a$—[O—$(CF_2)_b]_c$—, —$[(CF_2)_a$—O—$]_b$—$[(CF_2)_c$—O—$]_d$, and combinations thereof, wherein a, b, c, and d are independently at least 1.

7. An article comprising the composition according to claim 1.

8. The article of according to claim 7, wherein the article is at least one of: a surfactant, a dispersion stabilizer, or an initiator.

9. The composition according to claim 1, wherein the composition has a number average molecular weight of no more than 20,000 grams/mole.

10. A method for making a composition comprising: oligomerizing a halofluoroalkene monomer, $CX_7X_9=CX_8-(R_3)_p-CZ_5Z_6-Y$, with a sulfinating agent to produce the composition of formula (I),

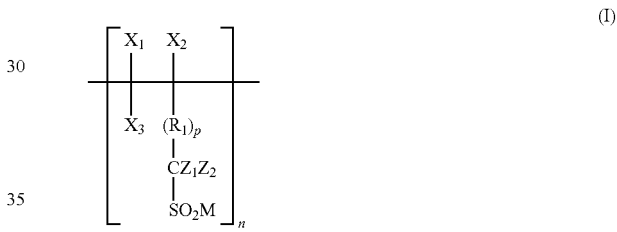

wherein $X_7$, $X_8$, and $X_9$ are independently selected from H, F, Cl, Br, I, $CF_3$, and $CH_3$, and wherein at least one of $X_7$, $X_8$, and $X_9$ is H; and $R_3$ is a linking group; $Z_5$ and $Z_6$ are independently selected from Br, Cl, I, F, $CF_3$, and a perfluoroalkyl group; p is 0 or 1; and Y is selected from I, Br, and Cl.

11. The method according to claim 10, wherein the halofluoroalkene monomer is selected from $BrCF_2CH=CH_2$, $ICF_2CH=CH_2$, $BrCF_2CF_2CH=CH_2$, $ICF_2CF_2CH=CH_2$, $CBr_3CF_2CF_2CH=CH_2$, $CCl_3CF_2CF_2CH=CH_2$, $ICF_2CF_2CH_2CH=CH_2$, $BrCF_2CF_2CH_2CH=CH_2$, $ICF_2CF_2CF_2CF_2CH=CH_2$, $BrCF_2CF_2CF_2CF_2CH=CH_2$, $ICF_2CF_2CF_2CF_2CH_2CH=CH_2$, and $BrCF_2CF_2CF_2CF_2CH_2CH=CH_2$.

12. The method according to claim 10, wherein no oxidizing agent is added during the oligomerization.

13. The method according to claim 10, further comprising a second monomer, and the second monomer is selected from non-fluorinated olefin, a partially fluorinated olefin, and a perfluorinated olefin.

14. The method according to claim 10, further comprising a solvent, wherein the solvent is water.

15. The method according to claim 10, further comprising a buffer system.

16. The method according to claim 15, wherein the buffer system is buffered at a pH greater than 2.

17. The method according to claim 10, wherein the sulfinating agent system is selected from: $Na_2S_2O_4$, NaHSO$_3$/(NH$_4$)$_2$Ce(NO$_3$)$_6$, NaHSO$_3$/FeCl$_3$, NaHSO$_3$/K$_3$[Fe(CN)$_6$], HOCH$_2$SO$_2$Na, (NH$_2$)$_2$CSO$_2$, Na$_2$S$_2$O$_5$, and combinations thereof.

18. The method according to claim 10, wherein the oligomerizing is conducted at a temperature of between 20 to 100° C.

19. The method according to claim 10, wherein the oligomerizing is conducted under an oxygen-free atmosphere.

\* \* \* \* \*

UNITED STATES PATENT AND TRADEMARK OFFICE
CERTIFICATE OF CORRECTION

| | | |
|---|---|---|
| PATENT NO. | : 9,580,526 B2 | Page 1 of 1 |
| APPLICATION NO. | : 13/885185 | |
| DATED | : February 28, 2017 | |
| INVENTOR(S) | : Zai-Ming Qiu | |

It is certified that error appears in the above-identified patent and that said Letters Patent is hereby corrected as shown below:

On the Title Page

Column 2,
Line 12, under "Other Publications", delete "trichloroopolyfluoroalkanes"," and insert -- trichloropolyfluoroalkanes", --, therefor.

In the Specification

Column 5,
Line 49, delete "-$CF_2$.," and insert -- -$CF_2$, --, therefor.

Column 10,
Line 25, after "$CF_2=CFOCF_2CF_2CF_2OCF_3$" insert -- . --.

In the Claims

Column 16,
Lines 1-2, in Claim 5, delete "chlorotrifluoroehtylene," and insert -- chlorotrifluoroethylene, --, therefor.
Line 16, in Claim 8, after "article" delete "of".

Signed and Sealed this
Sixth Day of June, 2017

Michelle K. Lee
*Director of the United States Patent and Trademark Office*